United States Patent
Eppstein et al.

(10) Patent No.: US 8,195,694 B1
(45) Date of Patent: Jun. 5, 2012

(54) RESOLVING CONFLICTS BETWEEN ACTIONS THAT TARGET ELEMENTS OF A HIERARCHICAL DATA STRUCTURE

(75) Inventors: Christopher Mark Eppstein, Mountain View, CA (US); Frederick Vong, Fremont, CA (US)

(73) Assignee: Oracle America Inc., Redwood City, CA (US)

( * ) Notice: Subject to any disclaimer, the term of this patent is extended or adjusted under 35 U.S.C. 154(b) by 2301 days.

(21) Appl. No.: 10/832,575

(22) Filed: Apr. 26, 2004

(51) Int. Cl.
  *G06F 7/00*  (2006.01)
  *G06F 17/30* (2006.01)
(52) U.S. Cl. .................... 707/791; 707/802
(58) Field of Classification Search .......... 707/100–101, 707/102–3, 203, 1–10; 395/700
  See application file for complete search history.

(56) References Cited

U.S. PATENT DOCUMENTS

| | | | |
|---|---|---|---|
| 5,317,740 A * | 5/1994 | Sites | 717/129 |
| 6,535,892 B1 * | 3/2003 | LaRue et al. | 707/203 |
| 6,601,076 B1 * | 7/2003 | McCaw et al. | 707/203 |
| 6,717,593 B1 | 4/2004 | Jennings | |
| 6,718,516 B1 | 4/2004 | Claussen et al. | |
| 6,751,719 B1 * | 6/2004 | Peloquin et al. | 711/210 |
| 7,058,947 B1 * | 6/2006 | Raja et al. | 718/104 |
| 7,107,279 B2 * | 9/2006 | Pociu | 707/102 |
| 2003/0018643 A1 * | 1/2003 | Mi et al. | 707/10 |
| 2004/0107179 A1 * | 6/2004 | Dalrymple et al. | 707/1 |
| 2004/0153875 A1 * | 8/2004 | Amyot et al. | 714/47 |

OTHER PUBLICATIONS

Martel et al., Dynamic Prioritized Conflict Resolution on Multiple Access Broadcast Networks, Sep. 1996, IEEE, vol. 45, Issue 9, pp. 1074-1079.*
Lam et al., Integrated concurrency control protocol for hard real-time database systems, Jul. 1997, IEEE, vol. 144, Issue 4, pp. 214-218.*
Orbeon, Inc., "OXF Tutorial, An Introduction to the OXF XML Platform," 2004, pp. 1-32.

* cited by examiner

*Primary Examiner* — Wilson Lee
*Assistant Examiner* — Jessica N Le
(74) *Attorney, Agent, or Firm* — Osha • Liang LLP

(57) ABSTRACT

A mechanism is disclosed for resolving conflicts between actions that target elements of a hierarchical data structure. Actions that are associated with criteria that are satisfied by an element of a target data structure are selected from among a plurality of specified actions. The selected actions are sorted by action type. Actions that conflict with a first-ordered action are determined. If the priority of the first-ordered action is the highest of the priorities of the conflicting actions, then the first-ordered action is performed and the other conflicting actions are canceled such that they are not performed relative to the element. Otherwise, the first-ordered action is canceled and processing continues with the next-ordered element. This conflict resolution technique may be applied to each of the remaining sorted actions in order, and for each element in the target data structure.

27 Claims, 4 Drawing Sheets

RESOLVING CONFLICTS BETWEEN ACTIONS THAT TARGET ELEMENTS OF A HIERARCHICAL DATA STRUCTURE

BACKGROUND

Hierarchical data structures may be used to represent user interfaces for computer programs. For example, a hierarchical data structure such as an Extensible Markup Language ("XML") document may contain multiple elements, each representing some aspect of a user interface. For example, an element in a hierarchy might represent a menu bar such as is found in many graphical user interfaces. The menu bar element might have several child elements, such as an element for a "file" submenu, an element for an "edit" submenu, and an element for a "view" submenu, for example. Each of these elements might also have several child elements. For example, the file element might have child elements for "new," "open," "close," and "save" operations.

Using such a hierarchical data structure as a guide, a computer program can automatically render a user interface for display. Often, it is much easier for a user interface designer to modify such a hierarchical data structure than to modify the source code of a computer program. Modifying a hierarchical data structure, as opposed to source code, typically requires less knowledge about computer programming languages, and provides fewer opportunities to introduce errors into a computer program.

Several different approaches may be practiced when modifying a hierarchical data structure. One approach uses XML-based User Interface Language ("XUL") overlays. XUL overlays are XUL documents that specify one or more user interface elements that are to be inserted into an existing XUL document. XUL is a specialized version of XML that is designed specifically for describing user interfaces. A user interface designer can create an XUL overlay and provide both the XUL overlay and a target XUL document to a computer program that inserts, into the target XUL document, new user interface elements specified in the XUL overlay.

XUL overlays are not capable of specifying any modifications to an XUL document other than insertions of new user interface elements. XUL overlays are not capable of specifying modifications to hierarchical data structures other than XUL documents. New user interface elements specified in an XUL overlay are inserted into an XUL document as child elements of existing parent elements wherever such parent elements are found to have a specified element identifier, regardless of the level at which those parent element occur in the hierarchy of the XUL document. XUL overlays do not provide any other means of specifying where, in a target XUL document, a new user interface element should be inserted.

Another approach to modifying a hierarchical data structure uses XML Update Language ("XUpdate") to specify, in XML, modifications that are to be made to a target XML document. XUpdate uses XML Path Language ("XPath") to indicate where, in the target XML document's hierarchical structure, specified modifications are to be made.

Because)(Path expresses location references relative to the hierarchical structure of the target XML document, XUpdate will not apply a specified modification correctly if the hierarchical structure of the target document does not contain the exact hierarchical path specified in association with the modification. In many circumstances, the hierarchical structure of a target XML document is prone to frequent change.

SUMMARY

In accordance with one embodiment of the present invention, a mechanism is disclosed for resolving conflicts between actions that target elements of a hierarchical data structure. In one embodiment, actions that are associated with criteria that are satisfied by an element of a target hierarchical data structure are selected from among a plurality of specified actions. Each action has an action type and a priority. The selected actions are sorted by action type. It is determined, based on one or more rules, whether a first-ordered action of the sorted actions conflicts with any of the other sorted actions. If such a conflict exists, then the priority of the first-ordered action is compared to the priorities of the conflicting actions. If the first-ordered action has the highest priority, then the first-ordered action is performed and the other conflicting actions are canceled such that they are not performed relative to the element. Otherwise, the first-ordered action is canceled and processing continues with the next-ordered element. In one embodiment, this conflict resolution technique is applied to each of the remaining sorted actions in order. In one embodiment, the selection of actions, sorting of actions, and resolution of conflicts between actions is performed for each element in the target hierarchical data structure.

DETAILED DESCRIPTION OF EMBODIMENT(S)

Overview

Figure 1:
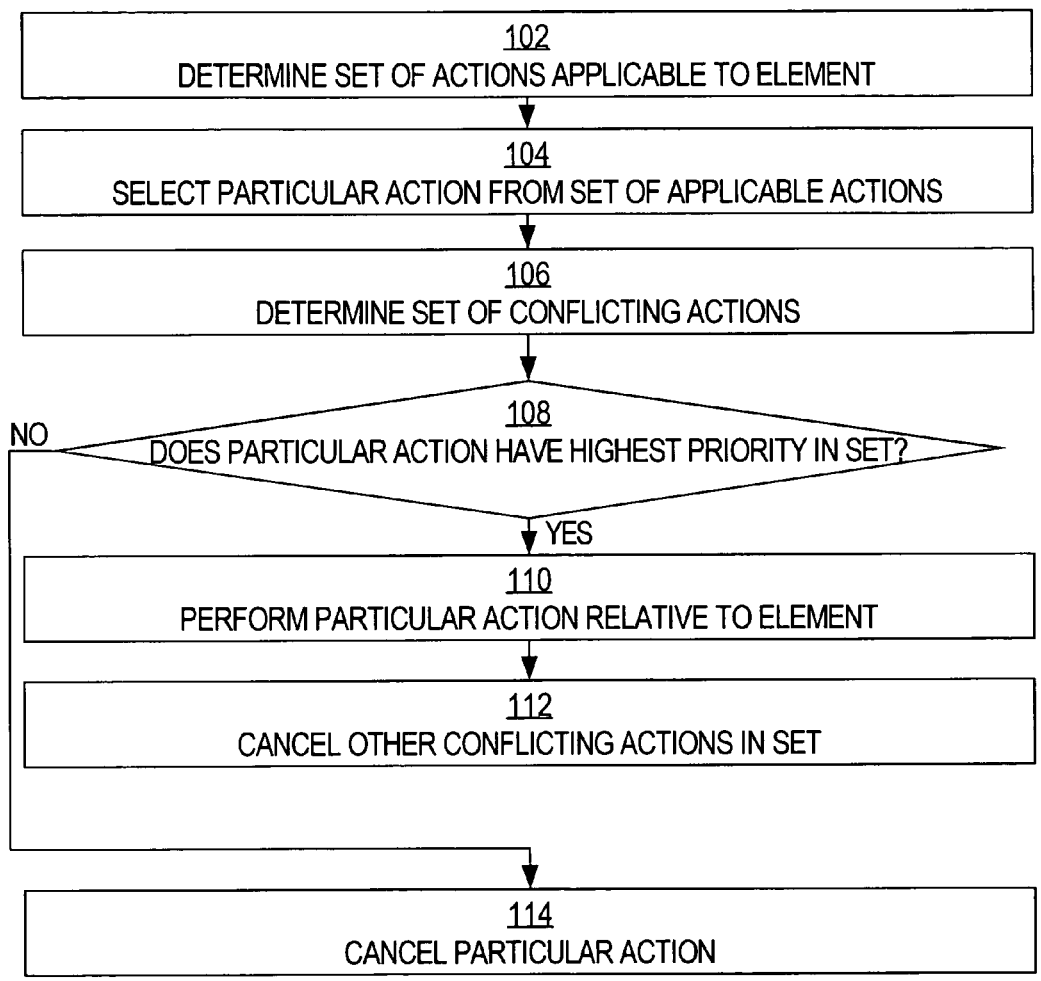
FIG. 1 depicts an overview of an operational flow for resolving conflicts between actions that target elements of a hierarchical data structure, in accordance with one embodiment of the present invention.

FIG. 1 depicts an overview of an operational flow for resolving conflicts between actions that target elements of a data structure, in accordance with one embodiment of the present invention. In block 102, a set of applicable actions is determined. Actions in the set of applicable actions are those that may be applied to an element of a target hierarchical data structure. In block 104, a particular action is selected from the set of applicable actions.

In block 106, a set of conflicting actions is determined. The set of conflicting actions comprises the particular action and actions in the set of applicable actions that conflict with the particular action. In block 108, it is determined whether the particular action has the highest priority of all actions in the set of conflicting actions. If the particular action has the highest priority, the control passes to block 110. Otherwise, control passes to block 114.

In block 110, the particular action is performed relative to the element. In block 112, actions in the set of conflicting actions other than the particular action are canceled, such that the actions in the set of conflicting actions other than the particular action are not performed relative to the element. Alternatively, in block 114, the particular action is canceled, such that the particular action is not performed relative to the element. Other actions in the set of conflicting actions may or may not be performed relative to the element thereafter.

Resolving Conflicts Between Actions

Figure 2:
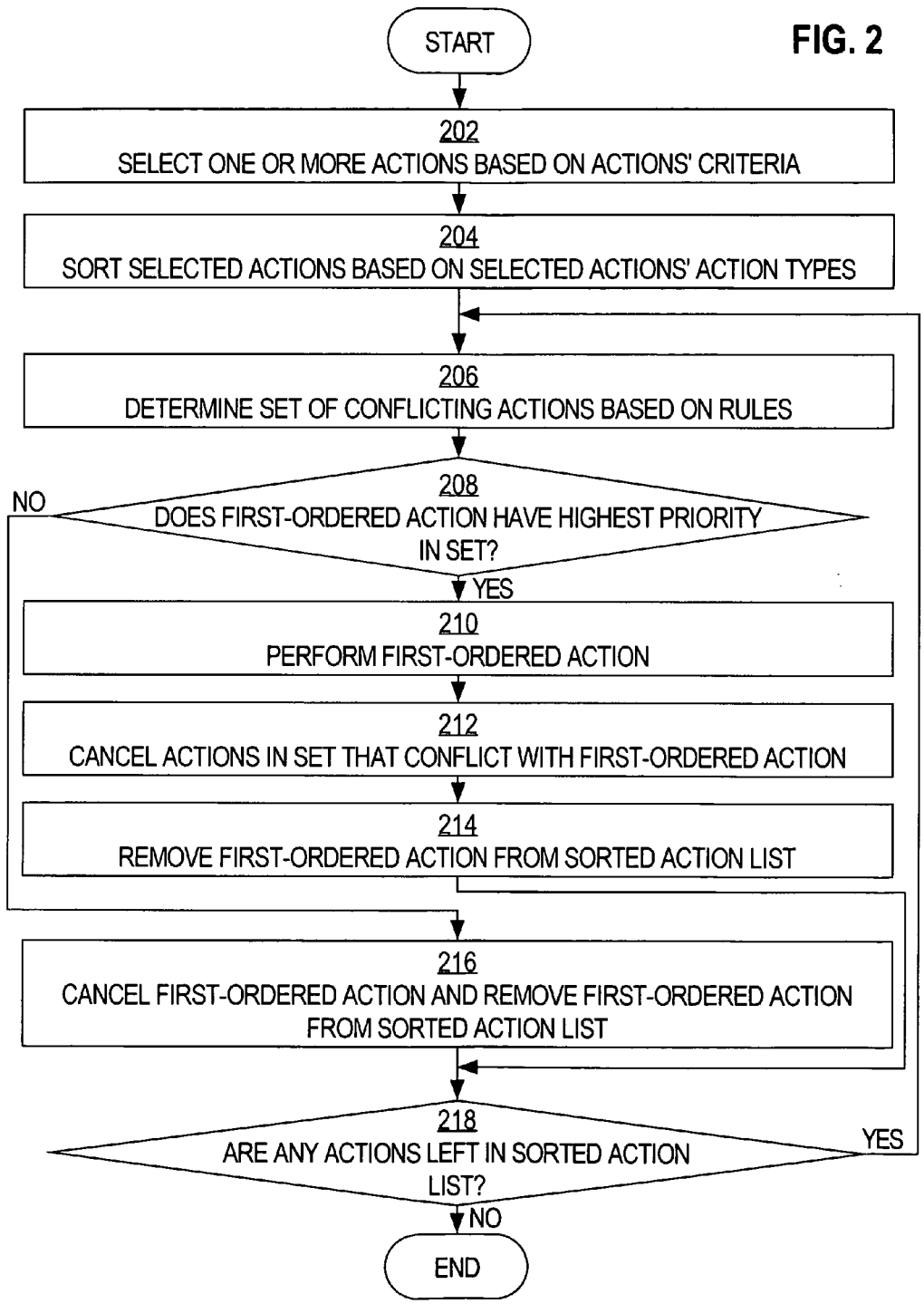
FIG. 2 depicts an operational flow for resolving conflicts between actions that target elements of a hierarchical data structure, in accordance with one embodiment of the present invention.

FIG. 2 depicts an operational flow for resolving conflicts between actions that target elements of a data structure, in accordance with one embodiment of the present invention. The operations described below may be applied separately for each element of a target data structure.

In block 202, one or more actions are selected from among a plurality of actions based on whether a particular element of a target data structure satisfies criteria that are associated with those actions. For example, a particular action's associated criteria might indicate that an element must have a specified name and specified attributes that have specified values in order to "match" the action. If a particular element has the specified name and the specified attributes that have the specified values, then the particular action is selected for the particular element.

In block 204, the selected actions (also referred to above as "applicable actions") are sorted based on their action types. For example, actions may be categorized into types based on the ways that those actions modify the target data structure. Actions that insert one or more new elements as child elements of other elements in the target data structure might be of an "insert child" action type. Actions that remove elements from the target data structure might be of a "remove" action type. Other actions may be of other action types. During the sorting process, actions of a particular action type are placed, according to a specified sort order, before actions of other action types. For example, actions of the "insert child" action type might be placed before actions of the "remove" action type in a sorted list of the selected actions.

In block 206, a set of conflicting actions is determined based on one or more rules. The set of conflicting actions comprises the first-ordered action and those of the selected actions that conflict with the particular action. For example, a rule might indicate that actions of a "remove" action type conflict with all other actions that occur later in the sorted list of selected actions.

In block 208, it is determined whether the first-ordered action has the highest priority of all actions in the set of conflicting actions. Each action in the sorted action list has an associated priority that is not dependent on that action's order in the sorted action list. The highest-priority action is the action that is associated with the highest priority of all priorities associated with the actions in the set of conflicting actions (ignoring those actions not contained in the set of conflicting actions). If the first-ordered action is the highest-priority action, the control passes to block 210. Otherwise, control passes to block 216.

In block 210, the first-ordered action is performed relative to the particular element of the target data structure. For example, if the first-ordered action indicates that a new element should be inserted as a child element of the particular element, then the new element is inserted as a child element of the particular element in a result data structure. Control then passes to block 212.

In block 212, actions in the set of conflicting actions, other than the first-ordered action, are canceled. Actions that are canceled are prevented from being performed relative to the particular element. The cancelled actions are removed from the sorted action list. Control then passes to block 214.

In block 214, the first-ordered action is removed from the sorted action list, making the next-ordered action in the sorted action list (if any) the new first-ordered action in the sorted action list. Control then passes to block 218.

Alternatively, in block 216, the first-ordered action is canceled and removed from the sorted action list. The removal of the first-ordered action may cause another action to become the new first-ordered action in the sorted action list. Control then passes to block 218.

In block 218, it is determined whether any other actions remain in the sorted action list. If so, then control loops back to block 206, so that conflict determination and resolution may be performed relative to the new first-ordered action in the sorted action list. If no actions remain in the sorted action list, then the operational flow ends relative to the particular element. The operations described above may be performed for each element of a target data structure.

Overlaying XML Modifications

According to one embodiment, the target data structure discussed above is a target XML document to which actions are to be applied, and each action in the plurality of actions is expressed in a separate XML element that indicates a modification to be performed relative to the target XML document. Although XML is used herein for purposes of illustration, the concepts described herein also may be applied using formats other than XML.

The actions in the plurality of actions may be distributed between multiple separate "overlay" documents, or may be consolidated within a single overlay document. Each overlay document may be a separate file. In one embodiment, a computer program receives, as input, identifiers of one or more overlay documents, each of which contains one or more actions to be applied to a target document. The computer program also receives, as input, an identifier of the target document. The computer program reads each of the actions from each of the identified overlay documents. The computer program stores each action in memory. Each action may be associated with one or more criteria that are specified with that action.

After the computer program has stored, in memory, all of the actions from all of the overlay documents, the computer program reads the identified target document, element-by-element. The computer program does not need to read the entire target document into memory at once. Consequently, the computer program is capable of applying actions to target documents of any size.

The computer program applies the operations of FIG. 2 for each element of the target document in sequence. Because all of the actions from all of the overlay documents are stored in memory, neither the order in which the computer program read the overlay documents nor the order in which the actions were specified in the overlay documents needs to have any impact on the order in which the actions are applied for any element of the target document.

As the computer program applies actions relative to an element of the target document, the computer program may write the results of those actions to a result document. The computer program does not need to store the entire result document in memory. After the computer program has applied the operations of FIG. 2 for all of the elements of the target document, including any elements that were inserted as a result of those actions, the result document is complete.

In one embodiment, whenever the computer program performs an action that would cause the computer program to insert an element to into the result document, the computer program applies the operations of FIG. 2 for the inserted element before writing the inserted element to the result document.

Figure 3:
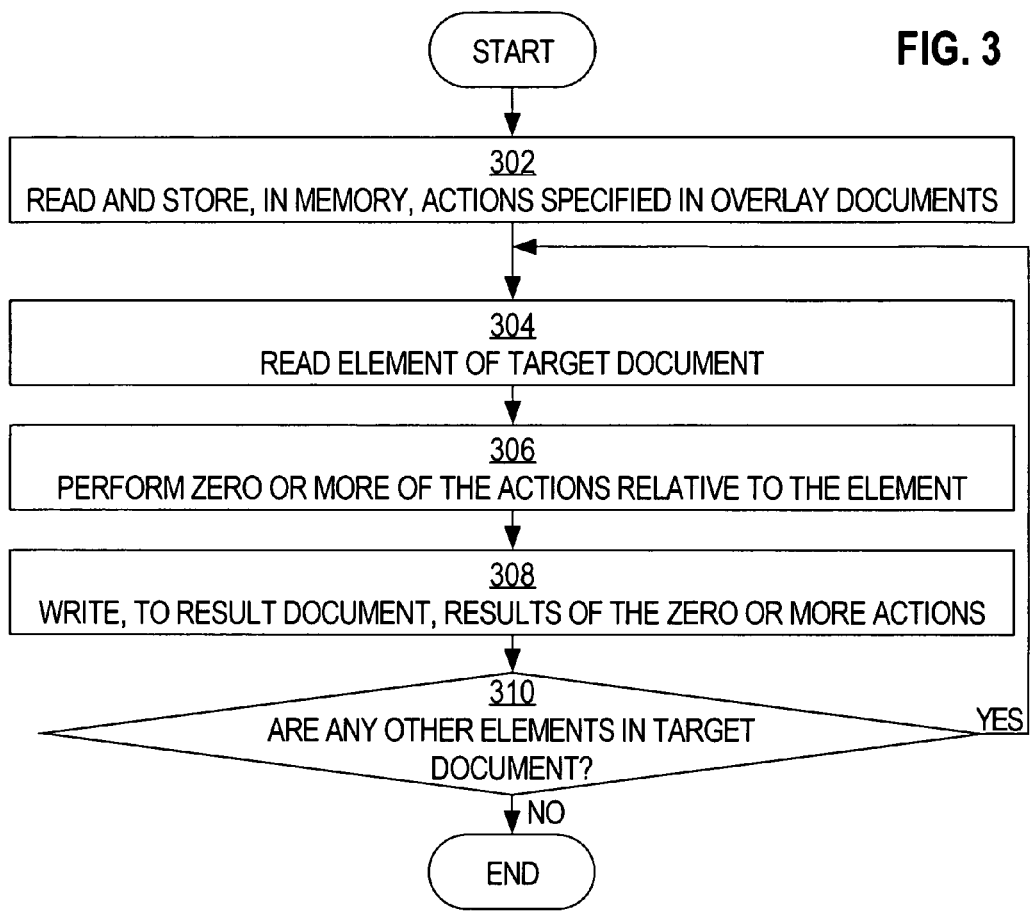
FIG. 3 depicts an operational flow for applying, to a target document, actions specified in one or more overlay documents, to produce a result document, in accordance with one embodiment of the present invention.

FIG. 3 depicts an operational flow for applying, to a target document, actions specified in one or more overlay documents, to produce a result document, in accordance with one embodiment of the present invention. In block 302, for each particular overlay document in a plurality of specified overlay documents, the actions contained in the particular overlay document are read and stored in memory.

In block 304, an element of a specified target document is read. In block 306, zero or more of the actions that are stored in memory are performed relative to the element, in accordance with the operations described above with reference to FIG. 2. It is possible that the element might not satisfy any of the actions' associated criteria. In that case, none of the actions are performed relative to the element. If any of the actions performed would cause an element to be inserted, then zero or more of the actions that are stored in memory are performed relative to the inserted element.

In block 308, the results of the zero or more actions that were performed relative to the element, along with any elements that were inserted as results thereof, are written to a result document. If no actions were performed relative to the element, then the element is written to the result document unmodified. If the element was removed as a result of the actions, then the element is not written to the result document.

In block 310, it is determined whether any other elements are contained in the target document. If so, then control loops back to block 304, in which the next element in the target document is read. If no other elements are contained in the target document, then the operational flow ends.

Selecting Applicable Actions

As described above with reference to block 202 of FIG. 2, in one embodiment, one or more "applicable" actions are selected from among a plurality of actions based on whether a particular element of a target data structure satisfies criteria that are associated with those actions. In one embodiment, each action is one or more data structure elements that specify criteria in the form of a "key reference" and a list of one or more "key values". Each key reference refers to an identifier of a specified "key". For example, in one embodiment, an action may take the general form
    <namespace:action_identifier keyref=key_identifier keyvals=key_value_list options>
    ...
    </namespace:action_identifier>.

In one embodiment, a key is a data structure element that indicates a key identifier, a list of one or more element identifiers, and a list of one or more attribute identifiers. The element identifiers and attribute identifiers may be qualified by namespace prefixes. For example, in one embodiment, a key may take the general form
    <namespace:key name=key_identifier
        elementTypes=element_identifier_list
        attrs=attribute_identifier_list/>.

In one embodiment, keys are contained in the same overlay documents that contain the actions whose key references indicate those keys' identifiers.

In one embodiment, several conditions need to be satisfied in order for a particular action to be selected for application relative to a target element. For example, in one embodiment, the particular action is not selected unless the target element's identifier matches at least one of the element identifiers in the particular action's key's list of element identifiers. For another example, in one embodiment, the particular action is not selected unless the target element contains the same attributes as those contained in particular action's key's list of attribute identifiers. For another example, in one embodiment, the particular action is not selected unless the values of the target element's attributes are the same as those contained in the particular action's list of key values.

For example, in one embodiment, if a key has been specified as
    <ovly:key name="divKey" elementTypes="div" attrs="id">
then a particular action such as
    <ovly:insert keyref="divKey" keyvals="div0" where="after">
    ...
    </ovly:insert>
would be selected for application relative to a target element such as
    <div id="div0">
    ...
    </div>
because (a) the target element's identifier, "div," is contained in the particular action's key's list of element identifiers, (b) the target element's only attribute, "id," is contained in the particular action's key's list of attribute identifiers, and (c) the value of the target element's "id" attribute, "div0," matches the value in the particular action's list of key values.

In one embodiment, when multiple attributes have been specified for a key, the key is interpreted as multiple keys having the same key identifier, with each such key containing a subset of the attributes in the specified key's attribute list, with zero or more of the attributes removed from the end of the attribute list. For example, in one embodiment, if a key has been specified as
    <ovly:key name="myKey" elementTypes="foo" attrs="attr1 attr2 attr3">
then the key is interpreted as multiple keys such as
    <ovly:key name="myKey" elementTypes="foo" attrs="attr1 attr2 attr3">
    <ovly:key name="myKey" elementTypes="foo" attrs="attr1 attr2">
    <ovly:key name="myKey" elementTypes="foo" attrs="attr1">.

In one embodiment, an action whose key reference corresponds to multiple keys is not selected for application relative to the target element unless the target element contains the same attributes as those contained in any one of the action's corresponding key's lists of attribute identifiers.

Sorting Actions by Action Type

As described above with reference to block 204 of FIG. 2, in one embodiment, actions selected for application to a particular element of a target data structure are sorted based on those selected actions' action types. For example, in one embodiment, the following action types exist, and the sort order of those action types is as follows: "insert child," "remove," "move," "insert sibling/parent," "modify text," "replace," and "modify attribute." For example, in one embodiment, actions of an "insert child" action type are placed before actions of a "remove" action type when sorted, and actions of the "remove" action type are placed before actions of a "move" action type when sorted.

In one embodiment, an action's action type is determined by the action's identifier (e.g., the first word after any namespace qualifier in a markup language tag) alone, or by a combination of the action's identifier and the associated value of a "where" attribute of the action. For example, in one embodiment, data structure elements having action identifiers "remove," "move," "text," "replace," and "attribute," respectively, are of "remove," "move," "modify text," "replace," and "modify attribute" action types, respectively. In one embodiment, a data structure element having "insert" as an identifier is of action type "insert parent/sibling" if the data structure element has a "where" attribute whose associated value is "before," "after," or "parent." In one embodiment, a data structure element having "insert" as an identifier is of action type "insert child" if the data structure element lacks a "where" attribute whose associated value is "before," "after," or "parent."

For example, in one embodiment, an action such as
<ovly:insert keyref="fooKey" keyvals="attr1" where="parent">
...
</ovly:insert>
is of the "insert parent/sibling" action type, while an action such as
<ovly:insert keyref="barKey" keyvals="attr1">
...
</ovly:insert>
is of the "insert child" action type.

In one embodiment, actions of the "insert child" action type cause one or more specified new elements to be inserted as child elements of the target element in a hierarchical data structure (e.g., an XML document, DOM object, or other tree structure). In one embodiment, actions of the "insert sibling/parent" action type cause one or more specified new elements to be inserted either as siblings or parents of the target element in a hierarchical data structure, depending on the associated value of the action's "where" attribute.

In one embodiment, actions of the "remove" action type cause a target element to be removed from a hierarchical data structure. In one embodiment, actions of the "move" action type cause a target element to be moved from one location in a hierarchical data structure to another location in the hierarchical data structure. In one embodiment, actions of the "replace" action type cause a target element to be replaced by one or more specified new elements in a hierarchical data structure.

In one embodiment, actions of the "modify text" action type cause text that in enclosed within markup language tags of a target element to be modified. In one embodiment, actions of the "modify attribute" action type either cause the value of a specified attribute of a target element to be modified or cause a specified attribute of a target element to be removed.

Determining Conflicting Actions

As described above with reference to block 206 of FIG. 2, a set of conflicting actions is determined based on one or more rules. For example, in one embodiment, the rules for determining whether a particular action conflicts with another action are as follows:

In one embodiment, actions of an "insert child" action type conflict with actions of "remove," "move," or "replace" action types if the actions of the "remove," "move," or "replace" action types cause child elements of a target element to be removed. In one embodiment, actions of the "remove," "move," and "replace" action types signify whether those actions cause child elements to be removed by specifying an "xferchildren" attribute with an associated value set to "yes" or "no." An action's inclusion or omission of such an attribute also may indicate whether that action causes child elements of a target element to be removed.

In one embodiment, actions of a "remove" action type conflict with all other actions occurring later in the sorted action list. In one embodiment, actions of a "move" action type conflict with all other actions of the "move" action type. In one embodiment, actions of a "modify text" action type conflict with actions of a "replace" action type that cause child elements of a target element to be removed. In one embodiment, actions of a "replace" action type conflict with actions of a "modify attribute" action type. In one embodiment, actions of a "modify attribute" action type that cause a particular attribute of a target element to be modified conflict with actions of the "modify attribute" action type that also cause the particular attribute of the target element to be modified.

Assigning Priorities To Actions

As described above with reference to block 208 of FIG. 2, in one embodiment, it is determined whether a first-ordered action has the highest priority of all actions in a set of conflicting actions. In one embodiment, each action is associated with a separate priority.

For example, in one embodiment, an action's priority is based on a priority that is associated with an overlay document that contains the action. In one embodiment, an action's priority is based on where the action occurs relative to other actions in the same overlay document.

In one embodiment, an action's priority is based on whether the action contains an "important" attribute whose associated value is set to "true." In one embodiment, an action that contains an "important" attribute whose associated value is set to "true" has a higher priority than all other actions that do not contain an "important" attribute whose associated value is set to "true," even if those other actions otherwise would be of a higher priority.

Hardware Overview

Figure 4:
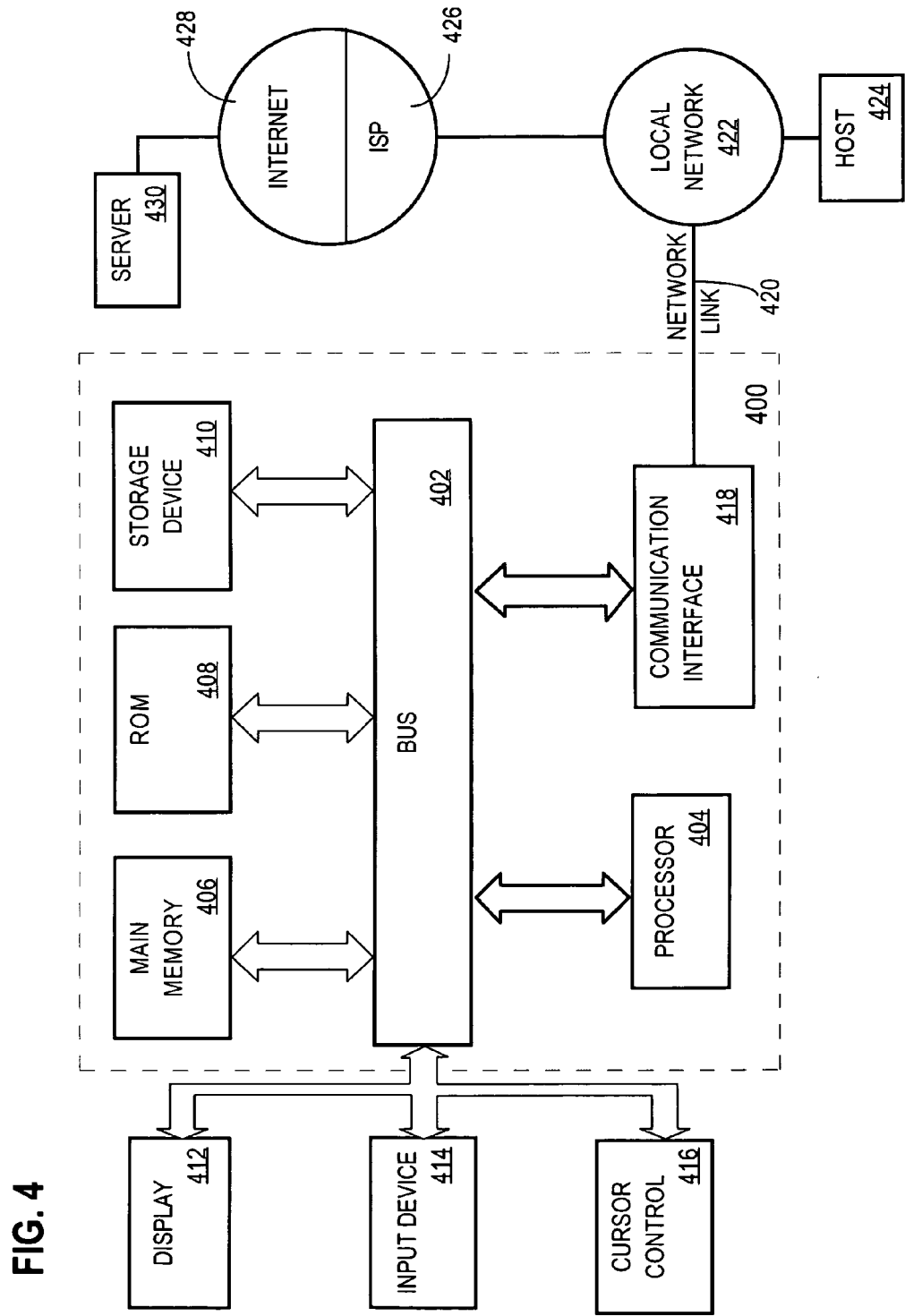
FIG. 4 is a hardware block diagram of a sample computer system, upon which one or more components of an embodiment of the present invention may be implemented.

FIG. 4 is a block diagram that illustrates a computer system 400 upon which an embodiment of the invention may be implemented. Computer system 400 includes a bus 402 for facilitating information exchange, and one or more processors 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions by processor 404. Computer system 400 may further include a read only memory (ROM) 408 or other static storage device coupled to bus 402 for storing static information and instructions for processor 404. A storage device 410, such as a magnetic disk or optical disk, is provided and coupled to bus 402 for storing information and instructions. Although the components of computer system 400 are depicted as being within a single chasse, it is contemplated that the components of computer system 400 may be distributed among multiple separate devices that are communicatively coupled via a network.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

In computer system 400, bus 402 may be any mechanism and/or medium that enables information, signals, data, etc., to be exchanged between the various components. For example, bus 402 may be a set of conductors that carries electrical signals. Bus 402 may also be a wireless medium (e.g. air) that carries wireless signals between one or more of the components. Bus 402 may also be a medium (e.g. air) that enables signals to be capacitively exchanged between one or more of the components. Bus 402 may further be a network connection that connects one or more of the components. Overall, any mechanism and/or medium that enables information, signals, data, etc., to be exchanged between the various components may be used as bus 402.

Bus 402 may also be a combination of these mechanisms/media. For example, processor 404 may communicate with storage device 410 wirelessly. In such a case, the bus 402, from the standpoint of processor 404 and storage device 410, would be a wireless medium, such as air. Further, processor 404 may communicate with ROM 408 capacitively. In this instance, the bus 402 would be the medium (such as air) that enables this capacitive communication to take place. Further, processor 404 may communicate with main memory 406 via a network connection. In this case, the bus 402 would be the network connection. Further, processor 404 may communicate with display 412 via a set of conductors. In this instance, the bus 402 would be the set of conductors. Thus, depending upon how the various components communicate with each other, bus 402 may take on different forms. Bus 402, as shown in FIG. 4, functionally represents all of the mechanisms and/or media that enable information, signals, data, etc., to be exchanged between the various components.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line. Appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method, comprising:
determining a set of applicable actions that are applicable to an element of a target hierarchical data structure, wherein determining the set of applicable actions comprises automatically selecting, from among a plurality of actions, only actions that are associated with criteria that are satisfied by the element of the target hierarchical data structure;
selecting a particular action from the set of applicable actions;
determining a set of conflicting actions that comprises the particular action and one or more actions in the set of applicable actions that conflict with the particular action;
determining whether the particular action is associated with a highest priority among actions in the set of conflicting actions;
in response to a determination that the particular action is associated with the highest priority:
performing the particular action relative to the element; and
canceling actions in the set of conflicting actions other than the particular action such that the actions in the set of conflicting actions other than the particular action are not performed relative to the element.

2. The method of claim 1, further comprising:
in response to a determination that the particular action is not associated with the highest priority, canceling the particular action such that the particular action is not performed relative to the element.

3. The method of claim 1, wherein at least one action in the set of applicable actions is specified in a modifying data structure that is separate from the target hierarchical data structure.

4. The method of claim 1, wherein:
at least one action in the set of applicable actions is specified in a first modifying data structure; and
at least one action in the set of applicable actions is specified in a second modifying data structure that is separate from the first modifying data structure.

5. The method of claim 1, further comprising:
sorting actions in the set of applicable actions based on types of actions.

6. The method of claim 5, wherein actions in the set of applicable actions that insert a first element into the target hierarchical data structure as a child element of a second element are of a first action type, and wherein sorting actions in the set of applicable actions comprises:
placing actions in the set of applicable actions that are of the first action type before actions in the set of applicable actions that are not of the first action type.

7. The method of claim 6, wherein actions in the set of applicable actions that remove an element from the target hierarchical data structure are of a second action type, and wherein sorting actions in the set of applicable actions comprises:
placing actions in the set of applicable actions that are of the second action type before actions in the set of applicable actions that are not of the first action type and not of the second action type.

8. The method of claim 1, wherein actions in the set of applicable actions that insert a first element into the target hierarchical data structure as a child element of a second element are of a first action type, and wherein actions in the set of applicable actions that remove one or more child elements of the first element from the target hierarchical data structure conflict with actions in the set of applicable actions that are of the first action type.

9. The method of claim 1, further comprising:
inserting a new element into the target data structure;
determining a second set of applicable actions that are associated with criteria that are satisfied by the new element;
sorting actions in the second set of applicable actions based on action types of the actions in the second set of applicable actions;
determining a second set of conflicting actions that comprises a first-ordered action in the second set of applicable actions and one or more actions in the second set of applicable actions that conflict with the first-ordered action;
determining whether the first-ordered action is associated with a highest priority among actions in the second set of conflicting actions;
in response to a determination that the first-ordered action is associated with the highest priority among actions in the second set of conflicting actions:
performing the first-ordered action relative to the new element; and
canceling actions in the second set of conflicting actions other than the first-ordered action such that the actions in the second set of conflicting actions other than the first-ordered action are not performed relative to the new element.

10. A tangible machine-readable medium, comprising:
instructions for causing one or more processors to determine a set of applicable actions that are applicable to an element of a target hierarchical data structure, wherein determining the set of applicable actions comprises automatically selecting, from among a plurality of actions, only actions that are associated with criteria that are satisfied by the element of the target hierarchical data structure;
instructions for causing one or more processors to select a particular action from the set of applicable actions;
instructions for causing one or more processors to determine a set of conflicting actions that comprises the particular action and one or more actions in the set of applicable actions that conflict with the particular action;
instructions for causing one or more processors to determine whether the particular action is associated with a highest priority among actions in the set of conflicting actions;
instructions for causing one or more processors to perform, in response to a determination that the particular action is associated with the highest priority, the particular action relative to the element; and
instructions for causing one or more processors to cancel, in response to a determination that the particular action is associated with the highest priority, actions in the set of conflicting actions other than the particular action such that the actions in the set of conflicting actions other than the particular action are not performed relative to the element.

11. The machine-readable medium of claim 10, further comprising:
  instructions for causing one or more processors to cancel, in response to a determination that the particular action is not associated with the highest priority, the particular action such that the particular action is not performed relative to the element.

12. The machine-readable medium of claim 10, wherein at least one action in the set of applicable actions is specified in a modifying data structure that is separate from the target hierarchical data structure.

13. The machine-readable medium of claim 10, wherein:
  at least one action in the set of applicable actions is specified in a first modifying data structure; and
  at least one action in the set of applicable actions is specified in a second modifying data structure that is separate from the first modifying data structure.

14. The machine-readable medium of claim 10, further comprising:
  instructions for causing one or more processors to sort actions in the set of applicable actions based on types of actions.

15. The machine-readable medium of claim 14, wherein actions in the set of applicable actions that insert a first element into the target hierarchical data structure as a child element of a second element are of a first action type, and wherein the instructions for causing one or more processors to sort actions in the set of applicable actions comprise:
  instructions for causing one or more processors to place actions in the set of applicable actions that are of the first action type before actions in the set of applicable actions that are not of the first action type.

16. The machine-readable medium of claim 15, wherein actions in the set of applicable actions that remove an element from the target hierarchical data structure are of a second action type, and wherein the instructions for causing one or more processors to sort actions in the set of applicable actions comprises:
  instructions for causing one or more processors to place actions in the set of applicable actions that are of the second action type before actions in the set of applicable actions that are not of the first action type and not of the second action type.

17. The machine-readable medium of claim 10, wherein actions in the set of applicable actions that insert a first element into the target hierarchical data structure as a child element of a second element are of a first action type, and wherein actions in the set of applicable actions that remove one or more child elements of the first element from the target hierarchical data structure conflict with actions in the set of applicable actions that are of the first action type.

18. The machine-readable medium of claim 10, further comprising:
  instructions for causing one or more processors to insert a new element into the target data structure;
  instructions for causing one or more processors to determine a second set of applicable actions that are associated with criteria that are satisfied by the new element;
  instructions for causing one or more processors to sort actions in the second set of applicable actions based on action types of the actions in the second set of applicable actions;
  instructions for causing one or more processors to determine a second set of conflicting actions that comprises a first-ordered action in the second set of applicable actions and one or more actions in the second set of applicable actions that conflict with the first-ordered action;
  instructions for causing one or more processors to determine whether the first-ordered action is associated with a highest priority among actions in the second set of conflicting actions;
  instructions for causing one or more processors to perform, in response to a determination that the first-ordered action is associated with the highest priority among actions in the second set of conflicting actions, the first-ordered action relative to the new element; and
  instructions for causing one or more processors to cancel, in response to a determination that the first-ordered action is associated with the highest priority among actions in the second set of conflicting actions, actions in the second set of conflicting actions other than the first-ordered action such that the actions in the second set of conflicting actions other than the first-ordered action are not performed relative to the new element.

19. An apparatus, comprising:
  a mechanism for determining a set of applicable actions that are applicable to an element of a target hierarchical data structure, wherein the mechanism for determining the set of applicable actions comprises a mechanism for automatically selecting, from among a plurality of actions, only actions that are associated with criteria that are satisfied by the element of the target hierarchical data structure;
  a mechanism for selecting a particular action from the set of applicable actions;
  a mechanism for determining a set of conflicting actions that comprises the particular action and one or more actions in the set of applicable actions that conflict with the particular action;
  a mechanism for determining whether the particular action is associated with a highest priority among actions in the set of conflicting actions;
  a mechanism for performing, in response to a determination that the particular action is associated with the highest priority, the particular action relative to the element; and
  a mechanism for canceling, in response to a determination that the particular action is associated with the highest priority, actions in the set of conflicting actions other than the particular action such that the actions in the set of conflicting actions other than the particular action are not performed relative to the element.

20. The apparatus of claim 19, further comprising:
  a mechanism for canceling, in response to a determination that the particular action is not associated with the highest priority, the particular action such that the particular action is not performed relative to the element.

21. The apparatus of claim 19, wherein at least one action in the set of applicable actions is specified in a modifying data structure that is separate from the target hierarchical data structure.

22. The apparatus of claim 19, wherein:
  at least one action in the set of applicable actions is specified in a first modifying data structure; and
  at least one action in the set of applicable actions is specified in a second modifying data structure that is separate from the first modifying data structure.

23. The apparatus of claim 19, further comprising:
  a mechanism for sorting actions in the set of applicable actions based on types of actions.

24. The apparatus of claim 23, wherein actions in the set of applicable actions that insert a first element into the target hierarchical data structure as a child element of a second element are of a first action type, and wherein the mechanism for sorting actions in the set of applicable actions comprises:
   a mechanism for placing actions in the set of applicable actions that are of the first action type before actions in the set of applicable actions that are not of the first action type.

25. The apparatus of claim 24, wherein actions in the set of applicable actions that remove an element from the target hierarchical data structure are of a second action type, and wherein the mechanism for sorting actions in the set of applicable actions comprises:
   a mechanism for placing actions in the set of applicable actions that are of the second action type before actions in the set of applicable actions that are not of the first action type and not of the second action type.

26. The apparatus of claim 19, wherein actions in the set of applicable actions that insert a first element into the target hierarchical data structure as a child element of a second element are of a first action type, and wherein actions in the set of applicable actions that remove one or more child elements of the first element from the target hierarchical data structure conflict with actions in the set of applicable actions that are of the first action type.

27. The apparatus of claim 19, further comprising:
   a mechanism for inserting a new element into the target data structure;
   a mechanism for determining a second set of applicable actions that are associated with criteria that are satisfied by the new element;
   a mechanism for sorting actions in the second set of applicable actions based on action types of the actions in the second set of applicable actions;
   a mechanism for determining a second set of conflicting actions that comprises a first-ordered action in the second set of applicable actions and one or more actions in the second set of applicable actions that conflict with the first-ordered action;
   a mechanism for determining whether the first-ordered action is associated with a highest priority among actions in the second set of conflicting actions;
   a mechanism for performing, in response to a determination that the first-ordered action is associated with the highest priority among the actions in the second set of conflicting actions, the first-ordered action relative to the new element; and
   a mechanism for canceling, in response to a determination that the first-ordered action is associated with the highest priority among the actions in the second set of conflicting actions, actions in the second set of conflicting actions other than the first-ordered action such that the actions in the second set of conflicting actions other than the first-ordered action are not performed relative to the new element.

* * * * *